United States Patent [19]
Heitzmann

[11] Patent Number: 5,285,344
[45] Date of Patent: Feb. 8, 1994

[54] OVERVOLTAGE PROTECTION DEVICE

[75] Inventor: Wolfgang Heitzmann, Wasserburg, Fed. Rep. of Germany

[73] Assignee: SGS-Thomson Microelectronics GmbH, Grasbrunn, Fed. Rep. of Germany

[21] Appl. No.: 803,068

[22] Filed: Dec. 6, 1991

[30] Foreign Application Priority Data
Dec. 10, 1990 [DE] Fed. Rep. of Germany ....... 4039404

[51] Int. Cl.$^5$ ............................................. H02H 7/09
[52] U.S. Cl. ......................................... 361/22; 361/18
[58] Field of Search ...................... 361/91, 18, 26, 21, 361/56; 307/30; 322/8

[56] References Cited
U.S. PATENT DOCUMENTS

| | | |
|---|---|---|
| 3,488,560 | 1/1970 | Konopa . |
| 4,262,243 | 4/1981 | Mori et al. ............................. 361/22 |
| 4,268,787 | 5/1981 | Sloan .................... 361/22 |
| 4,315,204 | 2/1982 | Sievers et al. ........................ 361/21 |
| 5,089,766 | 2/1992 | Iwatani ................... 361/21 |

FOREIGN PATENT DOCUMENTS

| | | |
|---|---|---|
| 0118779 | 9/1984 | European Pat. Off. . |
| 2009880 | 11/1971 | Fed. Rep. of Germany . |
| 3803259 | 8/1988 | Fed. Rep. of Germany . |
| 2382789 | 9/1978 | France . |
| 2553944 | 4/1985 | France . |
| WO90/07815 | 7/1990 | World Int. Prop. O. . |

OTHER PUBLICATIONS
"Überspannungsschutz," pp. 22-25, No date.
"Technische Unterrichtung," Bosch, four pages, No date.
"Impressum," Drehstromgenerator, pp. 436 and 437, 1984.

Primary Examiner—Todd DeBoer
Attorney, Agent, or Firm—Spencer, Frank & Schneider

[57] ABSTRACT

An overvoltage protection device for protecting the electrical system of a vehicle against overvoltages, the vehicle having an on-board wiring network connected to an electrical generator and having electrical devices connected thereto, includes a controllable switch for effectively short-circuiting the generator in case of an overvoltage condition. The switch includes a switching transistor connected in parallel to the generator. Evaluation circuitry connected to receive the generator voltage is provided for issuing a first evaluation signal when a predetermined overvoltage threshold is exceeded and for issuing a second evaluation signal when the generator voltage subsequently falls below a predetermined low voltage threshold. A memory is provided for receiving the evaluation signals and for controlling the switching transistor. The memory stores one of the received evaluation signals until receipt of the other evaluation signal. Furthermore, during storage of the first evaluation signal, the memory controls the switching transistor to effectively short-circuit the generator and during storage of the second evaluation signal, controls the switching transistor to assume a switching condition not effectively short-circuiting the generator.

14 Claims, 6 Drawing Sheets

OVERVOLTAGE PROTECTION DEVICE

BACKGROUND OF THE INVENTION

1. Field of the Invention

The invention relates to an overvoltage protection device for protecting the electrical system of a vehicle against overvoltages in particular in a vehicle having an on-board wiring network, fed by an electrical generator.

2. Background Information

Motor vehicles usually have an electrical system comprising a multiplicity of electrical devices fed from an on-board network. The on-board wiring network in turn is fed by an electrical generator. Furthermore, the on-board network has a battery connected thereto from which the on-board network is fed when the generator delivers too little electrical energy or no electrical energy at all. The latter is the case when the engine of the vehicle is at a standstill.

During operation, overvoltages may occur in the on-board wiring network, for instance in case of temporary interruptions between the battery and the on-board network, which may be caused by disconnection of the battery while the engine, and thus the generator, is running or may be due to intermittent or loose contacts. Overvoltages may also occur in case of so-called load dumps, i.e. when electrical equipment of the vehicle is switched off during operation, such as blower motors, setting motors for seat adjustments, setting motors for power windows, etc. As a result of such load dumps, a reduction of the magnetic field present in the generator occurs and, as is generally known, such reduction leads to inductively generated voltage pulses that may reach considerably high voltage and energy values. The pulse height is dependent on the field excitation of the generator, on the speed thereof and on the load remaining at the generator at the moment of disconnection from the battery or at the moment of load dump.

More detailed information in this respect is available from DIN (German Industrial Standard) 40 839, Part 1, in particular section 4.6.5, ISO/TR 7637/1 to section 2.3.2.5, and from a publication of the automotive supply company Bosch entitled "Überspannungsschutz" (overvoltage protection).

Such voltage spikes cause problems in the electrical systems of modern motor vehicles. Quite a lot of the electrical equipment of such vehicles, e.g. on-board computers, electronic control devices for anti-lock systems, the electronic control system for the internal combustion engine, include integrated semiconductor circuits which may be caused to malfunction due to overvoltages, or be permanently damaged thereby.

Various attempts have been made to control such harmful interference voltage pulses. One possibility uses so-called suppressor diodes disposed either in each of the electrical devices of the electrical system of the vehicle or centrally at the generator. Such diodes are supposed to limit the interference voltage pulses to a safe maximum voltage. However, this solution entails the following problems.

A substantial part of the energy during load dump is converted to heat in a suppressor diode. Calculations show that the temperature in the suppressor diode may be increased by approx. 90° C. for example. At ambient temperatures of about 100° C., as may occur in the engine compartment of motor vehicles, chip temperatures of 190° C. and thus created. These temperatures are above the temperatures usually managable for common semiconductor components.

Furthermore, there is the fact that the voltage limited by the suppressor diode is strongly dependent on the current and the voltage tolerance range to be taken into consideration is thus increased considerably. With suppressor diodes, considering the current dependency thereof, the tolerance range of the voltage to be limited is between 24 V minimum and 40 V maximum. This leads to considerable problems in the on-board wiring network, since further protective diodes for limiting lower energy pulses must be provided above this tolerance range. Thus, the on-board network is afflicted with positive energy pulses of up to 50 V, despite a considerable expenditure of protective diodes.

Due to these voltage spikes, the semiconductor components used in the electronic devices and modules must have a breakdown voltage $V_{CEO}$ of $\geq 50$ V. This results in considerable additional costs since high voltage technologies must be employed and the required chip area is increased thereby.

It is known from the afore-mentioned publication "Überspannungsschutz" to avoid overvoltages by short-circuiting the generator with the aid of a thyristor when the generator voltage exceeds a specific overvoltage threshold. In this case, the thyristor is activated via the gate thereof, whereby the thyristor changes to a condition of low impedance which virtually constitutes a short-circuit for the generator. However, this short-circuit condition can be terminated only by opening the ignition lock of the vehicle in order to thereby interrupt the voltage suppply of the overvoltage protection circuit and thus of the thyristor.

This problem is overcome by means of an overvoltage protection circuit as it is known from the publication "Überspannungsschutz" as well, which comprises an automatic activation means, which cancels the short-circuit of the generator when the interference voltage is over. For this purpose the thyristor has a relay connected in series therewith which, in case of activation of the thyristor, has the generator short-circuiting current flowing therethrough and as a consequence thereof constitutes a path bridging the anode-cathode path of the thyristor. On the one hand, this short-circuits the anode-cathode path of the thyristor so that the latter can switch off. On the other hand, the generator is held in the short-circuited condition also after switching-off of the thyristor. The relay will reopen the switch only after the generator current in the relay winding has dropped to a specific value.

The relay of this known overvoltage protection circuit entails problems. On the one hand, relays as electromechanical components are subject to mechanical wear and thus have a correspondingly restricted lifetime.

On the other hand, relays lead to tolerance problems as a result of aging effects, production leakages etc. In order to safely protect the sensitive semiconductor components of the electrical system of the vehicle it is thus necessary to again allow for a relatively large voltage range and to design the semiconductor components again for relatively high voltage strengths. Furthermore, besides, due to their inductive properties, relays react in a comparatively slow manner to electrical changes.

SUMMARY OF THE INVENTION

It is an object of the invention to make available an overvoltage protection device of the type indicated at the outset which, when semiconductor elements with low breakdown voltage are used, provides safe protection against overvoltages overcoming the above-mentioned problems.

According to the invention, this object is met in that a switching means includes a switching transistor means connected in parallel to the generator, that an evaluation means is provided to which the generator voltage is applied and which issues a first evaluation signal when a predetermined overvoltage threshold is exceeded and issues a second evaluation signal when the value subsequently falls below a predetermined low voltage threshold, and in that a memory means is provided to which the evaluation signals can be applied and which controls the switching transistor means and which stores the respectively received evaluation signal up to receipt of the respective other evaluation signal and which, furthermore, during storage of the first evaluation signal controls the switching transistor means to assume a switching condition short-circuiting the generator and during storage of the second evaluation signal controls the switching transistor means to assume a switching condition not short-circuiting the generator.

By monitoring the generator voltage with respect to upwardly exceeding of the overvoltage threshold and downwardly exceeding of the low voltage threshold, switching of the switching transistor means can be guaranteed at virtually exact voltage thresholds. The voltage thresholds may be set in an arbitrary manner so that short-circuiting of the generator can also be effected safely when relatively low overvoltages are exceeded. Furthermore switching back to the not short-circuited the generator condition also takes place with high accuracy as regards the low voltage threshold that may be chosen, an improvement over the use of a relay. By storing a respective evaluation signal delivered by the evaluation means until the other evaluation signal occurs, and by utilizing the stored value for controlling the switching condition of the switching transistor means, it is guaranteed that the generator, which is short-circuited when the overvoltage threshold is exceeded, is released from its short-circuited condition definitely only after detection that the voltage has dropped below the low voltage threshold.

BRIEF DESCRIPTION OF THE DRAWINGS

The invention will now be described in more detail on the basis of embodiments with reference to the drawings in which.

DETAILED DESCRIPTION OF THE PREFERRED EMBODIMENT(S)

Figure 1:
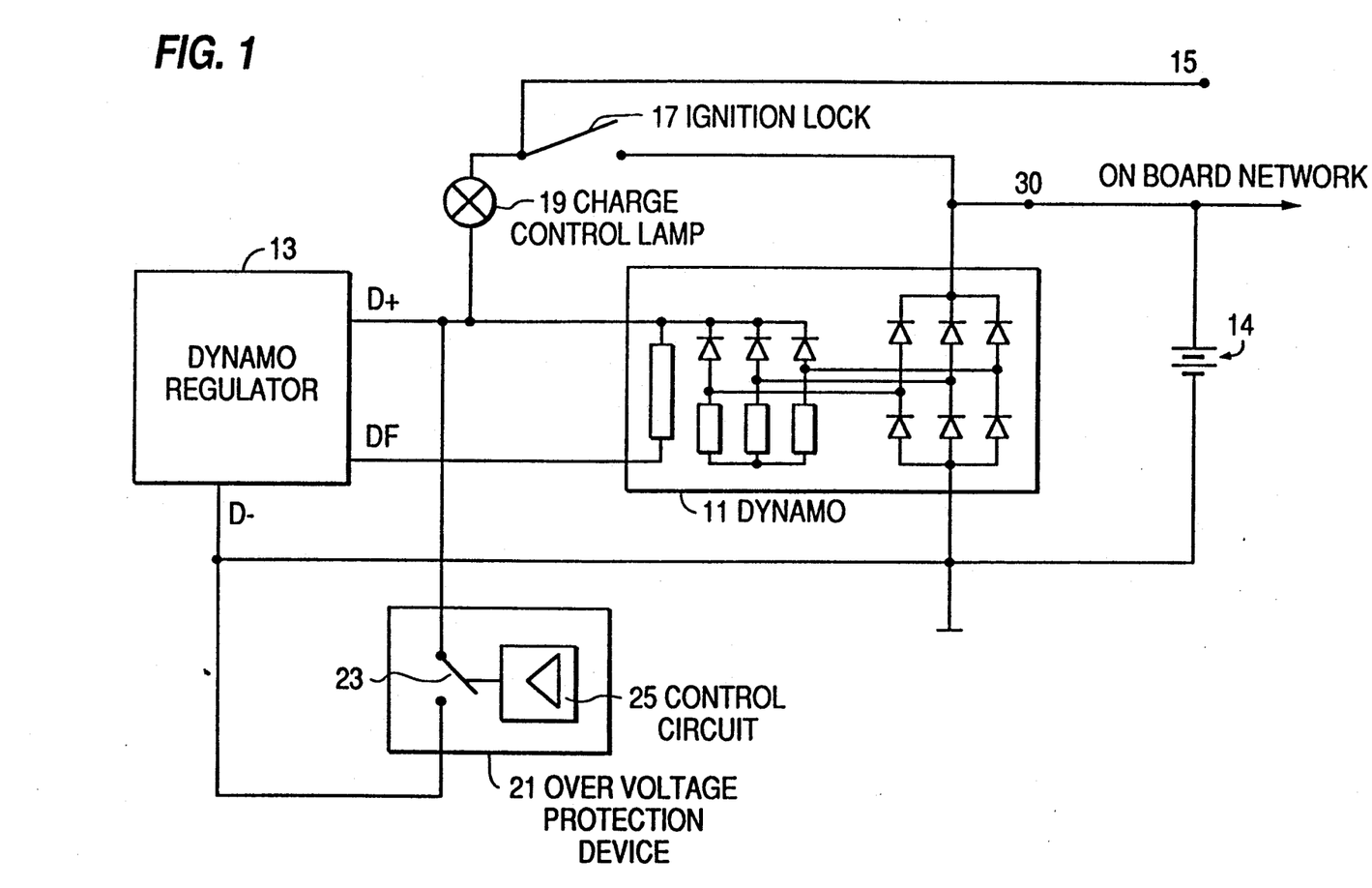
FIG. 1 shows an example of a voltage supply circuit for supply of the on-board wiring network of a vehicle, which is equipped with an overvoltage protection device.

FIG. 1 shows a conventional voltage supply circuit for an on-board wiring network of a vehicle, in which however an overvoltage protection device according to the invention is inserted. Connecting points for the onboard network are designated with "15" and "30".

A generator 11, which often is also termed dynamo, is connected via terminals D+, D− and DF to a dynamo regulator 13 of usual type which thus need not be described here in more detail. A battery 14 is connected in parallel to generator 11. The battery takes over the energy supply of the on-board network when the generator does not supply sufficient electrical energy or no electrical energy at all because the generator is turning too slowly or not turning at all when the internal combustion engine of the vehicle is at a standstill, respectively. Supply of the bottom 14 to the on-board network is made via terminal 30. By means of an ignition lock 17, the generator can be connected into the on-board network. A charge control lamp 19 is connected in series with the ignition lock 17.

Figure 2A:
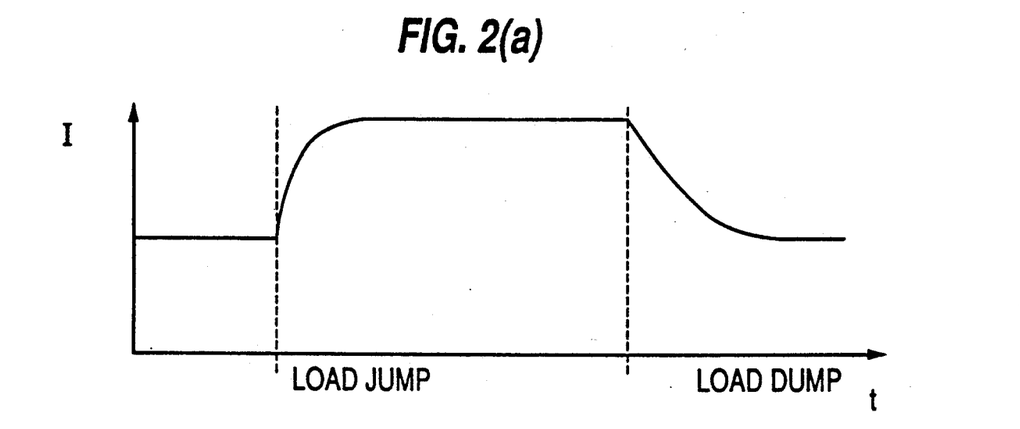
FIG. 2 shows current and voltage curves of a voltage supply circuit according to FIG. 1 which is not provided with an overvoltage protection device.
Figure 2B:
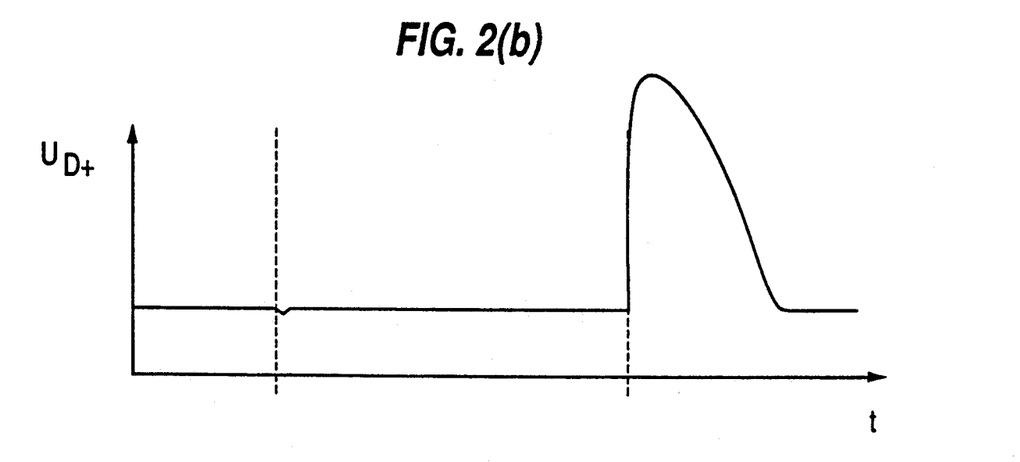
Figure 2C:
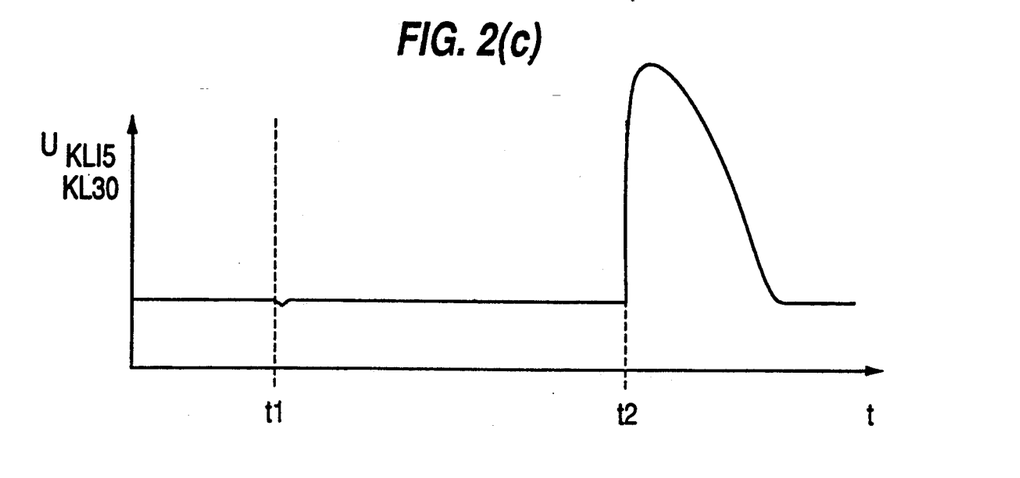

Connected between terminals D+ and D− is an overvoltage protection device 21 according to the invention, which comprises a switch 23 shown in an open state in FIG. 1 and a control circuit 25 controlling said switch 23 and which will be described in the following text in more detail by way of FIGS. 3 and 4. On the basis of FIG. 2, the behavior of the supply voltage source shown in FIG. 1 shall be considered first in a condition when no overvoltage protection device is provided. FIG. 2 shows in curve patterns (a), (b) and (c) the generator exciting current, the generator voltage and the on-board network voltage, respectively, as a function of time t. It is assumed in this respect that a load jump occurs at a moment of time t1 which changes into a load dump at a moment of time t2. During the load jump, a higher current is demanded from the generator. Due to the inductive properties of the generator, the exciting current decreases only gradually starting as of the time t2. These inductive properties of the generator also result in a voltage pulse beginning at the load deactivation at the time t2, as shown in FIG. 2 curve (b). This voltage pulse in unhindered manner reaches the on-board network and thus the various electrical devices of the vehicle which are connected to the on-board wiring network.

This interference voltage pulse is countered by the overvoltage protection device 21. The latter will now be described by way of FIGS. 3 and 4.

Figure 3:
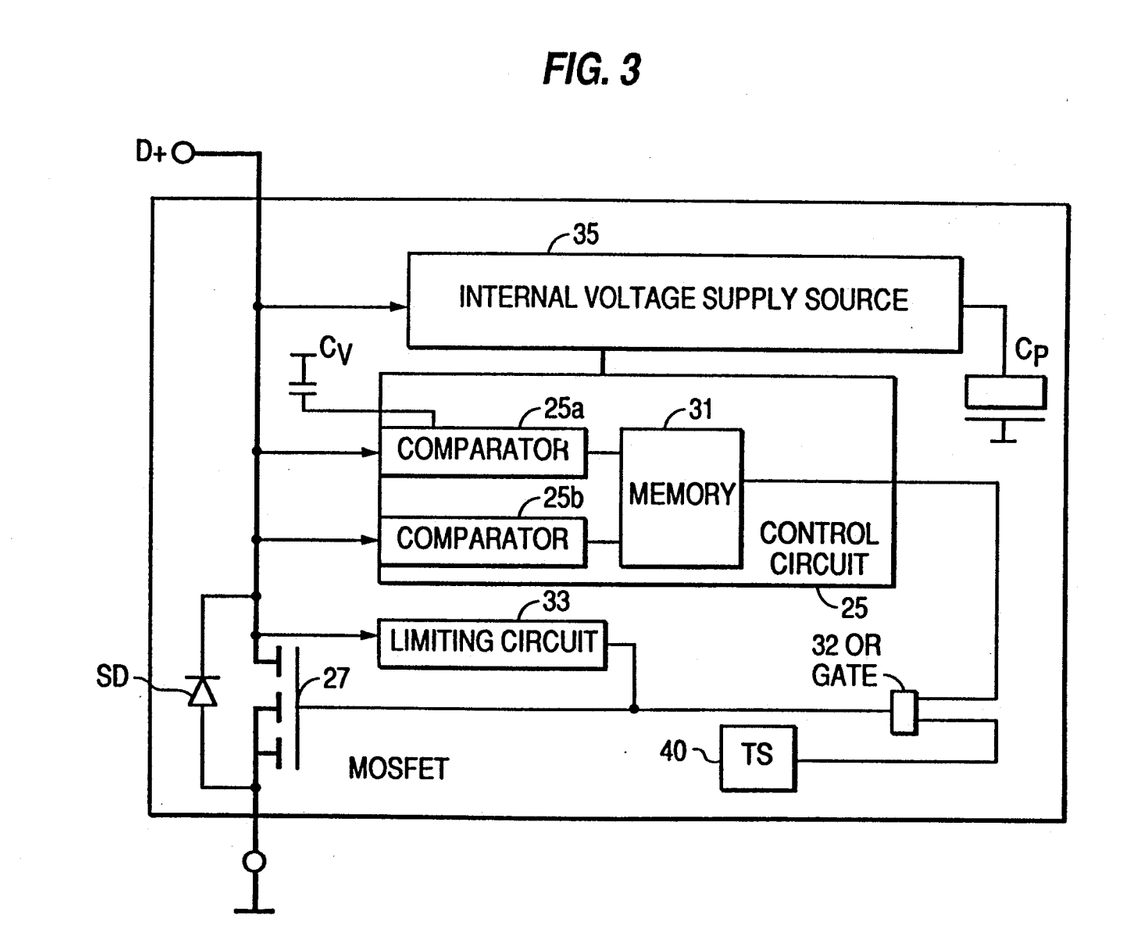
FIG. 3 shows a block diagram of an embodiment of an overvoltage protection device according to the invention.

FIG. 3 shows a control circuit 25 and a MOSFET 27 as a switch. MOSFET 27 is connected between terminal D+ and ground and thus parallel to generator 11.

The control circuit 25 comprises a first comparator 25a and a second comparator 25b which each receive the generator voltage at terminal D+. With the aid of reference voltages, not shown in FIG. 3, a response threshold of, for example, 5 V and 80 mV is preset for comparators 25a and 25b, respectively. These response thresholds constitute an overvoltage threshold and a low voltage threshold, respectively.

The outputs of the two comparators 25a and 25b are connected to two inputs of a memory means 31 having its output connected to the gate of MOSFET 27.

When the generator voltage exceeds the overvoltage threshold, the comparator 25a indicates this by issuing a first evaluation signal to the memory means 31. Due to input of the first evaluation signal, the memory means 31 issues a control signal switching MOSFET 27 into the conducting state. This results in a short-circuit of generator 11. Due to the fact that the first evaluation signal is retained by the memory means 31, the MOSFET 27 remains in the conducting state and the generator remains short-circuited even in case the generator voltage meanwhile has dropped again below the overvoltage threshold. This condition lasts until the generator voltage drops below the low voltage threshold, whereby the comparator 25b is caused to issue a second evaluation signal to the memory means 31. As a result of this, the memory means 31 delivers to MOSFET 27 a control signal switching MOSFET 27 into the blocking state and thus terminating the short-circuit of generator 11. As of this time, the memory means 31 retains the second evaluation signal until it receives again the first evaluation signal from comparator 25a when the overvoltage threshold is again exceeded.

Figure 5A:
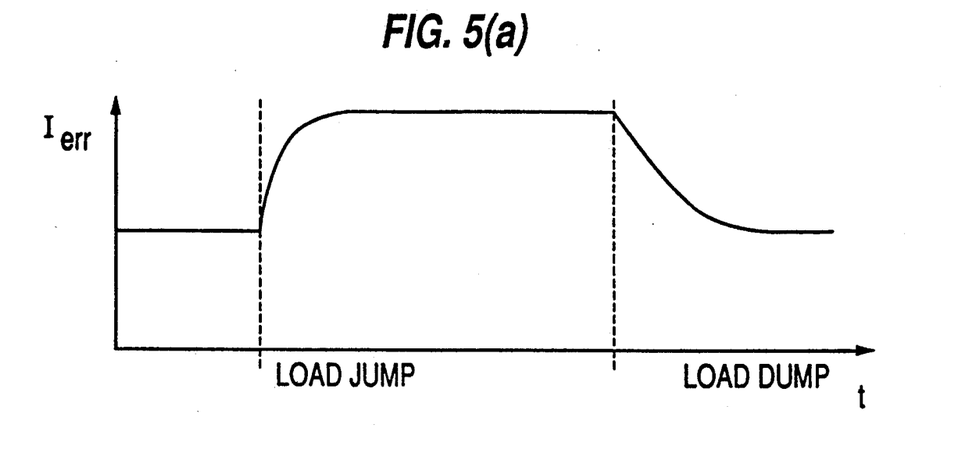
FIG. 5 shows current and voltage curves of the voltage supply circuit shown in FIG. 1 and equipped with an overvoltage protection device according to the invention.
Figure 5B:
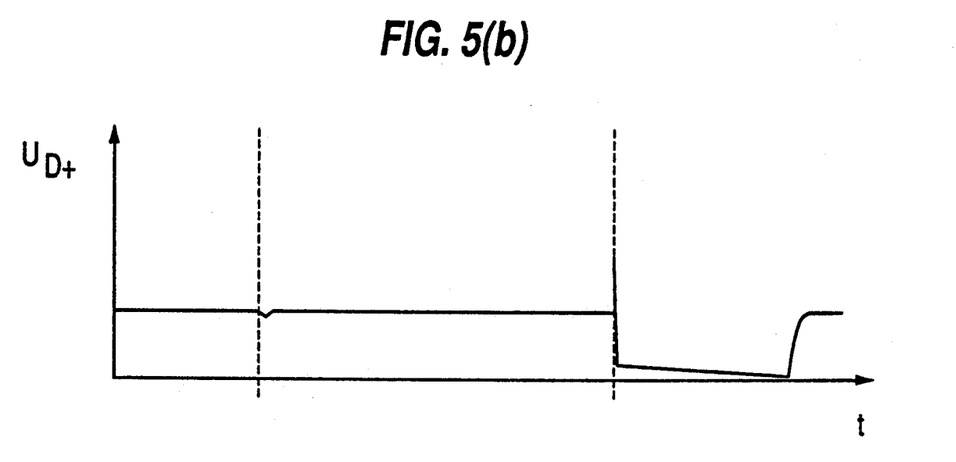
Figure 5C:
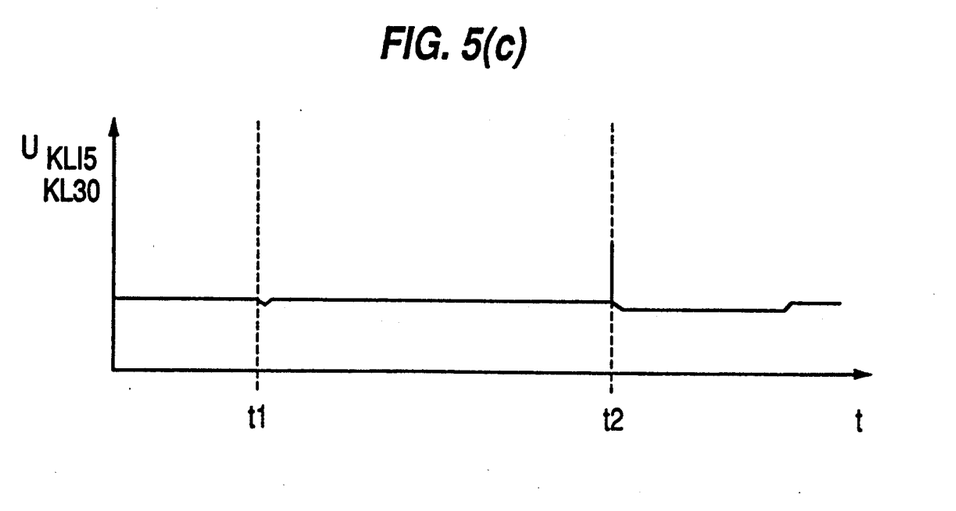

The effect of the overvoltage protection device 21 according to the invention is shown in FIG. 5. The curves (a), (b) and (c) thereof illustrate the generator exciting current $I_{err}$, the generator voltage $U_{D+}$, and the on-board network voltage $U_{KL15}$ and $U_{KL30}$, respectively, versus time. When again taking as basis a load jump and a subsequent load dump, as shown in FIG. 5 curve (a), there is a steep decrease of the generator voltage $U_{D+}$ to a very low voltage value essentially at the moment t2 because of the protective effect of the Overvoltage protection device 21.

As shown in FIG. 5 curve (c), the on-board network voltage $U_{KL15}$ and $U_{KL30}$, respectively, remains substantially unchanged during the load dump time, which is due to the buffering of the battery.

FIG. 5 shows in curves (b) and (c) a brief increase in generator voltage and terminal voltage, respectively, which is in the shape of a needle pulse. This will be considered in more detail in the following description by way of FIG. 6 illustrating an enlarged representation of the curve of the generator voltage $U_{D+}$ in the range of the load dump time.

At the beginning of the load dump, there is an increase in the generator voltage in the shape of a needle pulse, which however is limited in its height. Thereafter, there is a steep decrease of the generator voltage to almost 0 V. The limited needle pulse is produced by the cooperation of a delay circuit with a delay capacitor $C_V$ and a limiting circuit 33. The delay circuit has a predetermined delay period and has the effect that switching of the overvoltage protection device 21 to the protecting state occurs only when interference voltage pulses occur which are larger in width than the delay period of the delay circuit. The result obtained thereby is that the overvoltage protection device 21 does not respond to every interference pulse (see defined pulses DIN 40839) and thus too often. The generator voltage possibly could increase in an uncontrolled manner within the delay period. This is counteracted by limiting circuit 33 by means of which the generator voltage is limited to a predetermined limitation threshold within the delay period. To this end, MOSFET 27 is controlled to a medium level during the limitation operation of the limiting circuit 33.

Figure 6:
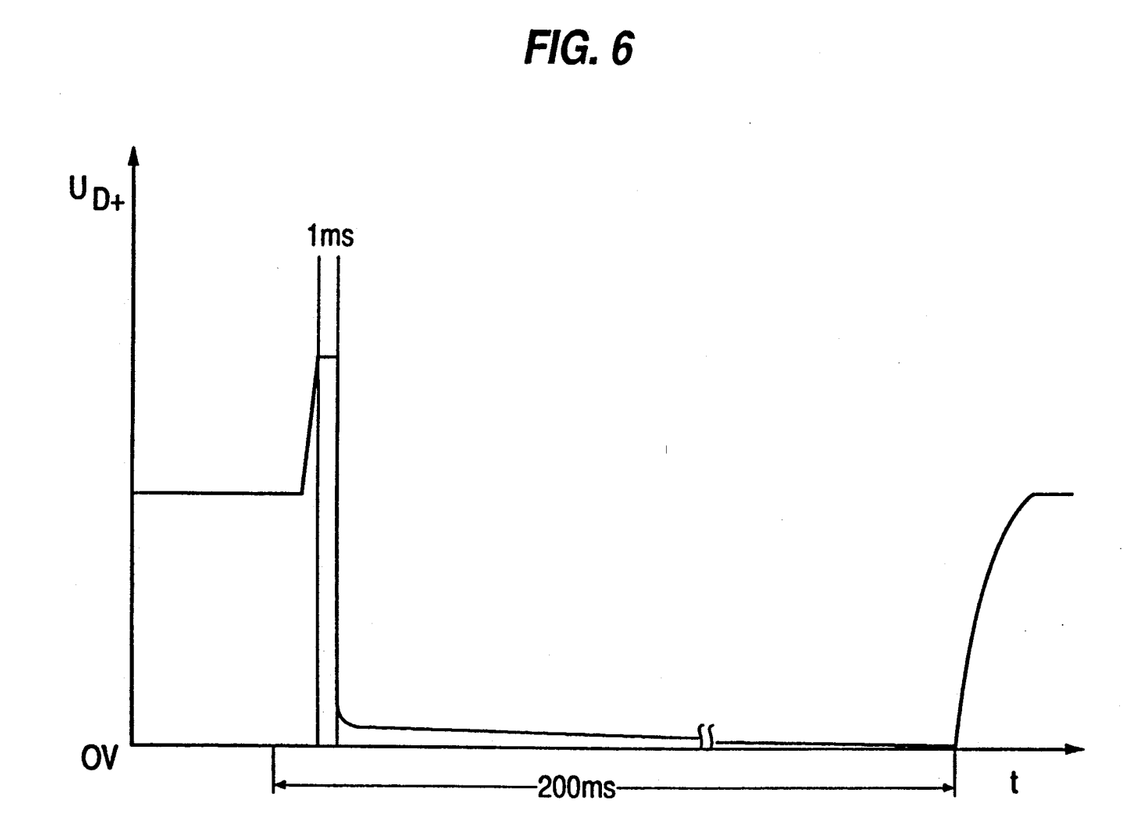
FIG. 6 shows the voltage curve of FIG. 5(b) in an enlarged and thus clearer manner.

During the short-circuit of the generator, during which the generator voltage D+ according to FIG. 6 is lowered to a very low value, the voltage supply of the circuit components of the overvoltage protection device 21 is maintained with the aid of an internal voltage supply source 35. To this end, a capacitor $C_P$ is provided that is charged to the generator voltage at times during which the generator is not short-circuited.

Figure 4:
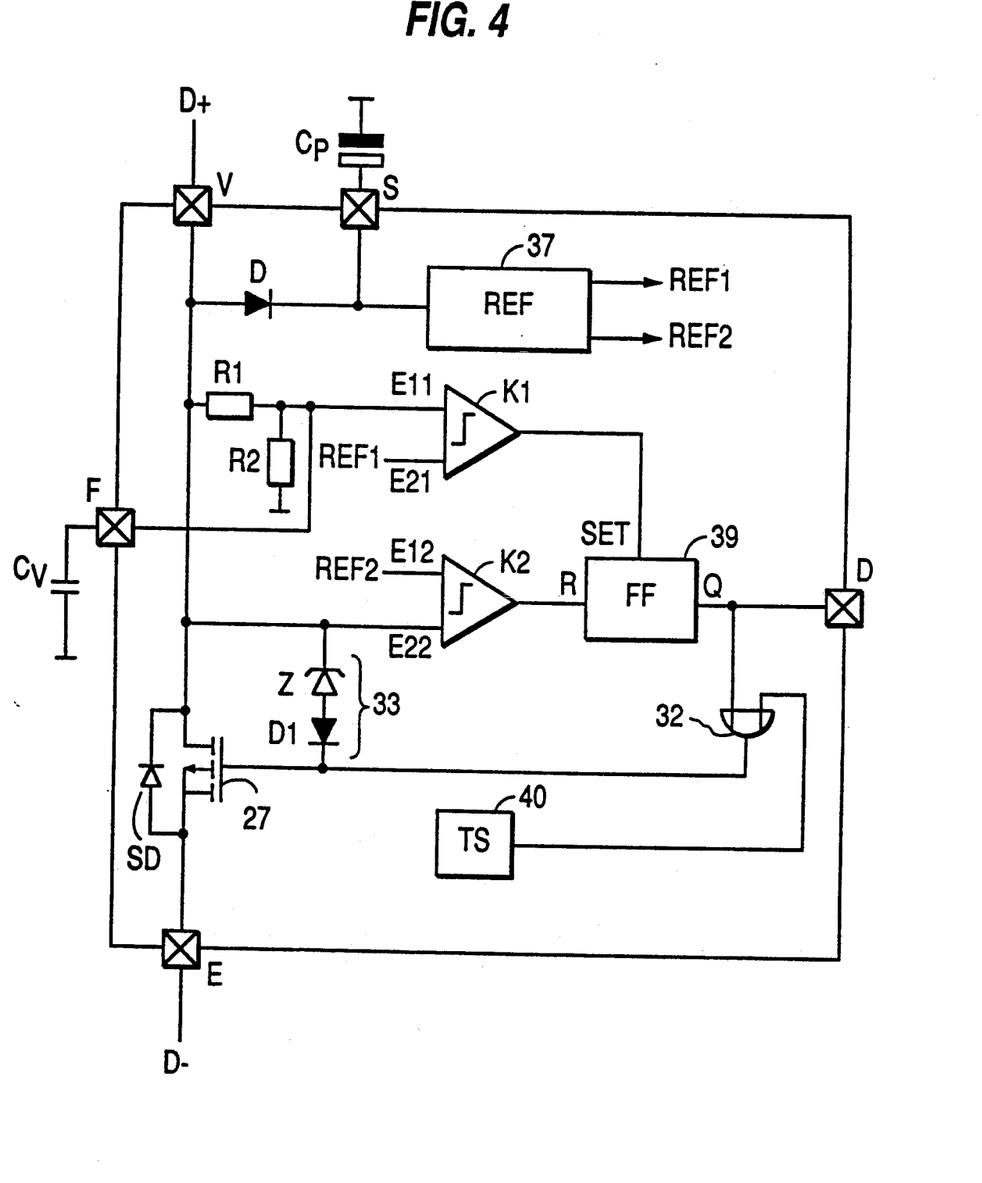
FIG. 4 shows a more detailed construction of the embodiment depicted in FIG. 3.

An embodiment of the overvoltage protection device 21 according to the invention, in the form of an integrated semiconductor device, is shown in FIG. 4. The integrated circuit comprises five connecting points. One connecting point V is connected to terminal D+ of the voltage supply circuit of FIG. 1. One connecting point E is connected to the ground terminal D− in FIG. 1. One connecting point F serves for connection of the delay capacitor $C_V$. One connection point S serves for connection of capacitor $C_P$ or the internal voltage supply source. And the last connection point D may be utilized further via an evaluation circuit or may be connected to a display device.

According to FIG. 4, two comparators K1 and K2 are provided which each have a first input terminal E11 and E22, respectively, and a second input terminal E21 and E12, respectively. The output terminals thereof are connected to setting input SET and resetting input R of a flip-flop 39, respectively. The output Q of the flip-flop 39 is connected to the gate of MOSFET 27 and to the evaluation output D.

The inputs E11 and E22 of comparators K1 and K2, respectively, are each connected to connection point V, E22 directly and E11 via a resistor R1. The resistor R1 belongs to a voltage divider R1 and R2 which together with the delay capacitor $C_V$ constitute the delay circuit. The inputs E21 and E12 of the comparators K1 and K2, respectively, have a first reference voltage Ref1 and, respectively, a second reference voltage Ref2 connected thereto. For instance, Ref1 may be a voltage of 5 V and Ref2 may be a voltage of 80 mV.

The connecting points V and S have a diode D connected therebetween which prevents discharge of the capacitor $C_P$ via MOSFET 27 during short-circuiting of the generator.

The limiting circuit 33 is constituted by a series connection of a Zener diode Z and a diode D1. When the generator voltage exceeds a limitation threshold predetermined by this limiting circuit 33, MOSFET 27 is controlled at a medium level, thereby effecting limitation of the generator voltage to a predetermined value.

A thermal protection means (TS) 40 connects MOSFET 27 through when a specific chip temperature upper threshold is reached. When the chip temperature reaches a chip temperature lower threshold, MOSFET 27 is deactivated again. For instance, the upper temperature threshold may be at 150° C. and the lower temperature threshold at 120° C. The output of the thermal protection means 40 is connected to a first input of an OR gate circuit 32 having a second input connected to the output of memory means 31. The output of OR gate circuit 32 is connected to the gate terminal of MOSFET 27.

The operation of the circuit shown in FIG. 4 is as follows:

When the voltage at terminal D+ rises because of an onsetting overvoltage pulse, comparator K1, after expiration of the delay time preset by the delay circuit, switches into a state in which it issues a setting signal to setting input SET of flip-flop 39. The signal created thereby at the output Q of flip-flop 39 controls MOSFET 27 into its connected-through or activated condition. Because of the memory effect of flip-flop 39, the MOSFET remains activated when the voltage at input E11 of comparator K1 has subsequently decreased. When the voltage across MOSFET 27 drops to a specific value at the end of the overvoltage pulse and when the value thereby becomes lower than the low voltage threshold, comparator K2 becomes responsive and resets flip-flop 39 via resetting input R thereof. MOSFET 27 is thereby deactivated again.

The connection point D in FIG. 4 may have connected thereto either a diagnosing or evaluating means or a display means for providing a display signalling the driver of the vehicle of the occurrence of an overvoltage accompanied by a short-circuit of the generator. This short-circuit is also indicated by the charge control lamp 19 on line D+. When overvoltages accompanied by short-circuiting of the generator are indicated frequently, this may warn the user of the vehicle that the on-board electrical system of the motor vehicle has a defect.

In case of too frequent high-energy overvoltage pulses, which may occur due to loose contacts of the on-board network lines or when the dynamo regulator is defective, the thermal protection means 40 protects the overvoltage protection device from destruction, with the function of the overvoltage protection circuit being retained.

In the embodiment depicted in FIGS. 3 and 4, the source-drain path of MOSFET 27 has a protective diode SD connected in parallel thereto.

The latter provides protection against negative interference pulses on line D+, see ISO/TR7637/1 section 2.3.2.7. In case of a wrong polarity connection of the overvoltage protection means, the diode becomes conductive and the charge control lamp 19 is permanently on.

The overvoltage protection means according to the invention affords the following advantages:

Upon occurrence of an overvoltage pulse, the maximum voltage at the on-board network is exactly determined during the delay phase by limitation to a voltage value predetermined by limiting circuit 33. The electric strength of the on-board electronic system as a whole can thus be set to a low level. This permits a considerable reduction of costs.

Due to the use of an electronic switch, the overvoltage protection means operates without wear and without susceptibility to shocks. It has considerably smaller dimensions than an overvoltage protection means employing a relay and thus is considerably less expensive in comparison therewith.

The overvoltage protection means according to the invention can be employed in any on-board network.

It will be apparent to one of ordinary skill in the art that the manner of making and using the claimed invention has been adequately disclosed in the above written description of the preferred embodiment taken together with the drawings.

It will be understood that the above description of the preferred embodiment of the present invention is susceptible to various modifications, changes, and adaptations, and the same are intended to be comprehended within the meaning and range of equivalents of the appended claims.

I claim:

1. An overvoltage protection device for protecting the electrical system of a vehicle against overvoltages, the vehicle having an on-board wiring network connected to an electrical generator and having electrical devices connected thereto, said protection device comprising:

controllable switching means for effectively short-circuiting the generator in case of an overvoltage condition, the switching means including a switching transistor means connected in parallel to the generator;

evaluation means, connected to receive the generator voltage, for issuing a first evaluation signal when a predetermined overvoltage threshold value is exceeded by the generator voltage and for issuing a second evaluation signal when the generator voltage subsequently falls below a predetermined low voltage threshold; and memory means for receiving the evaluation signals and for controlling the switching transistor means, said memory means storing one of the received evaluation signals until receipt of the other evaluation signal, wherein during storage of the first evaluation signal, said memory means outputs a signal for controlling the switching transistor means to effectively short-circuit the generator and, during storage of the second evaluation signal, said memory means outputs a signal for controlling the switching transistor means to assume a switching condition not effectively short-circuiting the generator.

2. An overvoltage protection device according to claim 1, wherein the switching transistor means comprises a MOSFET having a source-drain-path connected in parallel to the generator.

3. An overvoltage protection device according to claim 1, wherein the evaluation means comprises a first and a second comparator each comparator having a voltage monitoring input, a reference voltage input, and a comparator output coupled to the memory means;

the voltage monitoring inputs of both of the comparators are operatively coupled to receive the generator voltage;

the reference voltage input of the first comparator is operatively coupled to a first reference voltage corresponding to the overvoltage threshold;

the reference voltage input of the second comparator is operatively coupled to a second reference voltage corresponding to the low voltage threshold; and the first comparator issues the first evaluation signal when the overvoltage threshold is being exceeded by the generator voltage, and the second comparator issues the second evaluation signal when the generator voltage drops below the low voltage threshold.

4. An overvoltage protection device according to claim 1, wherein the memory means comprises a flip-flop, said flip-flop having a setting input for receiving the first evaluation signal, a resetting input for receiving the second evaluation signal, and an output signal supplied to the switch means as a switching control signal.

5. An overvoltage protection device according to claim 3, wherein a delay circuit with a corresponding pre-determined delay period is associated with the evaluation means, said delay circuit causing the evaluation means to issue the first evaluation signal only when the overvoltage threshold is exceeded for a period of time that is longer than the delay period predetermined by the delay circuit.

6. An overvoltage protection device according to claim 5, wherein the delay circuit comprises an RC circuit connected to the voltage monitoring input of the first comparator.

7. An overvoltage protection device according to claim 5, wherein the switching transistor means can be controlled to be in a partly conducting state; and the protection device further comprises limiting means, having a limiting threshold higher than a nominal voltage of the generator, for controlling the switching transistor means to be in the partly conducting state during the delay period when the generator voltage has exceeded the limiting threshold.

8. An overvoltage protection device according to claim 7, wherein the limiting means comprises a Zener diode means for providing the limiting threshold, said Zener diode means having one end coupled to a control terminal of the switching transistor means and being acted upon at its other end by the generator voltage.

9. An overvoltage protection device according to claim 1, wherein the overvoltage protection device has an internal voltage supply source associated therewith which supplies the overvoltage protection device with an operating voltage during the effective short-circuiting of the generator.

10. An overvoltage protection device according to claim 9, wherein the internal voltage supply source comprises a capacitor which is charged to a nominal voltage of the generator when the generator is not effectively short-circuited.

11. An overvoltage protection device according to claim 1, wherein the switching transistor means has connected in parallel thereto a protective diode means for protecting the switching transistor means from negative interference pulses and for indicating connection of the device to a wrong polarity via an indication lamp.

12. An overvoltage protection device according to claim 1, wherein the output signal of the memory means controlling the switching transistor means to effectively short-circuit the generator is fed to a terminal for an external device for evaluating the generator condition.

13. An overvoltage protection device according to claim 1, further comprising thermal protection means for controlling the switching transistor means so that when a predetermined upper temperature threshold is reached, the switching transistor effectively short-circuits the generator and, when the temperature thereafter drops below a predetermined lower temperature threshold, the switching transistor assumes the switching condition not effectively short-circuiting the generator.

14. An overvoltage protection device according to claim 13, further comprising an OR gate circuit having two inputs, one input thereof being connected to an output of the thermal protection means and the other input thereof being connected to the output of the memory means, said OR gate circuit having an output connected to a control input of the switching transistor means.

* * * * *